United States Patent
Hui et al.

(10) Patent No.: US 10,587,720 B2
(45) Date of Patent: Mar. 10, 2020

(54) NETWORK AWARE DYNAMIC CONTENT DELIVERY TUNING

(71) Applicant: T-Mobile USA, Inc., Bellevue, WA (US)

(72) Inventors: Jie Hui, Mercer Island, WA (US); Jeffery A. Smith, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 404 days.

(21) Appl. No.: 14/555,426

(22) Filed: Nov. 26, 2014

(65) Prior Publication Data
US 2015/0229569 A1 Aug. 13, 2015

Related U.S. Application Data

(60) Provisional application No. 61/938,692, filed on Feb. 11, 2014.

(51) Int. Cl.
| | |
|---|---|
| *H04L 12/801* | (2013.01) |
| *H04W 80/06* | (2009.01) |
| *H04L 29/06* | (2006.01) |
| *H04L 29/08* | (2006.01) |
| *H04L 12/825* | (2013.01) |

(52) U.S. Cl.
CPC .............. *H04L 67/32* (2013.01); *H04L 47/12* (2013.01); *H04L 47/25* (2013.01); *H04L 67/28* (2013.01); *H04L 69/163* (2013.01); *H04L 69/321* (2013.01)

(58) Field of Classification Search
None
See application file for complete search history.

(56) References Cited

U.S. PATENT DOCUMENTS

| | | | | |
|---|---|---|---|---|
| 6,587,438 B1* | 7/2003 | Brendel | ................ | H04L 1/1858 370/238 |
| 6,687,732 B1* | 2/2004 | Bector | ............. | H04L 29/12009 709/200 |
| 8,504,083 B1* | 8/2013 | Gill | ......................... | H04W 4/14 379/88.12 |
| 2002/0154645 A1* | 10/2002 | Hu | .......................... | H04L 29/06 370/401 |
| 2002/0169847 A1* | 11/2002 | Luna | ....................... | H04L 29/06 709/216 |
| 2003/0204602 A1* | 10/2003 | Hudson | ................... | D01D 5/423 709/228 |
| 2004/0260750 A1* | 12/2004 | Ruutu | ..................... | H04L 47/15 709/200 |
| 2008/0244260 A1* | 10/2008 | Feldman | ................. | H04L 12/66 713/153 |
| 2008/0304413 A1* | 12/2008 | Briscoe | ................... | H04L 69/16 370/235 |

(Continued)

Primary Examiner — Clayton R Williams
Assistant Examiner — Christopher B Robinson
(74) Attorney, Agent, or Firm — Han Santos, PLLC (57) ABSTRACT

Techniques and methods for dynamically tuning of content delivery over a communication network are described. In one aspect, a method of dynamically tuning of content delivery over a communication network may involve a user device detecting an event related to a content delivery traffic from an application server to the user device over the communication network. The method may also involve the user device communicating the detected event to the application server.

26 Claims, 6 Drawing Sheets

(56) References Cited

U.S. PATENT DOCUMENTS

| | | | | |
|---|---|---|---|---|
| 2011/0069616 A1* | 3/2011 | Revels | H04L 47/10 |
| | | | 370/236 |
| 2011/0167170 A1* | 7/2011 | Kovvali | H04W 28/06 |
| | | | 709/232 |
| 2012/0113893 A1* | 5/2012 | Damola | H04L 12/4633 |
| | | | 370/328 |
| 2013/0086262 A1* | 4/2013 | Bhadri | G06F 13/105 |
| | | | 709/224 |
| 2013/0235747 A1* | 9/2013 | Le | H04W 24/08 |
| | | | 370/252 |
| 2013/0258846 A1* | 10/2013 | Damola | H04W 80/06 |
| | | | 370/230 |
| 2014/0082146 A1* | 3/2014 | Bao | H04L 65/605 |
| | | | 709/219 |
| 2014/0254359 A1* | 9/2014 | Alisawi | H04W 28/0284 |
| | | | 370/230 |
| 2014/0269325 A1* | 9/2014 | Chrysos | H04L 47/115 |
| | | | 370/237 |
| 2014/0286438 A1* | 9/2014 | Apte | H04N 21/2343 |
| | | | 375/240.26 |

* cited by examiner

NETWORK AWARE DYNAMIC CONTENT DELIVERY TUNING

CROSS REFERENCE TO RELATED PATENT APPLICATION

The present disclosure is a non-provisional application claiming the priority benefit of provisional application U.S. Patent Application No. 61/938,692, filed on Feb. 11, 2014, which is incorporated by reference in its entirety.

BACKGROUND

A proxy server is a server that acts as an intermediary for requests from clients seeking resources from other servers. A client, e.g., a user device, connects to the proxy server requesting for a certain service, such as a file, connection, web page, or other resource available from a different server, and the proxy server evaluates the request as a way to simplify and control its complexity. However, analysis has shown that bypassing traffic of content delivery network (CDN) from the proxy server would benefit network capacity and user experience. Additionally, bypassing the proxy server may also benefit other traffic. For example, a content provider's data shows the use of proxy server(s) does not help HyperText Transfer Protocol Secure (HTTPS) traffic. Meanwhile the majority of traffic on social network websites is HTTPS traffic nowadays.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or non-transitory computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The present disclosure describes techniques that may be implemented in systems and methods of dynamically tuning of content delivery to a user device over a communication network by bypassing the proxy server. Moreover, embodiments of the techniques described herein may be implemented in a protocol so that an application server may communicate dynamically with a service provider, e.g., a cellular service provider, about congestion conditions.

Studies have shown that bypassing the proxy server for video traffic would provide a plethora of benefits. For example, bypassing the proxy server for video traffic would reduce traffic load on the core infrastructure of the communication network. Moreover, bypassing the proxy server for video traffic would have a positive impact on spectrum resources. For example, there would be some amount of reduction in downlink power and uplink load. There would also be reduction in the number of simultaneous users, which would save radio access network (RAN) baseband with respect to a cellular service provider. On the other hand, there would be negligible increase in signaling on the radio network controller (RNC). Another benefit is that bypassing the proxy server for video traffic would reduce battery consumption on the part of the user device which may be a portable communication device such as, for example, a smartphone, a laptop, a tablet computer or the like.

Embodiments of the present disclosure provide in-band and/or out-of-band signaling between a client and a server to allow content delivery traffic to be adjusted based on real-time network conditions. Bypassing the proxy server allows the client and server to communicate existing network conditions in real-time manner with various methods proposed herein. According to embodiments of the present application, in-band signal becomes an available option after bypassing the proxy server, while out-of-band signaling is available whether the proxy server is bypassed or not. In some embodiments, dynamic tuning of content delivery may be performed by a gateway or the content delivery server. In some embodiments, if the proxy server is not bypassed, the proxy server may perform the dynamic tuning. It is noteworthy that embodiments of the present disclosure may tune or otherwise change content delivery while the traffic path of content delivery remains somewhat constant.

According to embodiments of the present disclosure, with the proxy server bypassed, an end node is enabled to do dynamic tuning through either or both of in-band signaling and out-of-band signaling. In some embodiments, in-band signaling may be performed by any network node along the path of content delivery, including any NodeB and eNodeB of a radio access network and any gateway GPRS support node, packet data network gateway (PGW) and serving gateway (SGW) of a general packet radio service (GPRS) core network. In-band signaling may be conducted using the Transmission Control Protocol (TCP), e.g., via a TCP synchronization packet. Likewise, out-of-band signaling may be performed by any node in the network. Out-of-band signaling may be done during times of congestion. For example, an eNodeB or a self-organization node (SON) may receive input from the network, analyze the input, and notify other network nodes regarding the result of the analysis.

A network node in which an embodiment of the techniques of the present disclosure is implemented may take the signaling and perform dynamic content tuning. In some embodiments, the tuning may include one or more of the following: reducing initial quality of video traffic, reducing quality of video and/or data traffic being transferred (e.g., image quality), delaying transfer of notifications (e.g., email, app updates or any non-urgent items), improving initial quality of video and/or data traffic (e.g., tune down, tune up, speed up recovery stage), and restricting large data traffic (e.g., downloading or uploading of pictures and videos) during congestion.

A network node in which an embodiment of the techniques of the present disclosure is implemented may, upon detecting a network event (e.g., congestion), send one or more packets to communicate the detected event to an application server or any other network node. Besides congestion information, the communication may also indicate one or more windows of permitted and/or restricted activities, e.g., midnight is less congested so more activities can be scheduled to occur during that time. Accordingly, more content delivery (e.g., downloading of movies) may take place during times of less or no congestion (e.g., early morning) while less content delivery may be allowed during times of congestion. In some embodiments, the setting of window(s) of time of permitted and/or restricted activities may be artificially set by an operator, user and/or service provider. For example, a content provider may permit downloading of movies every Tuesday night.

In one aspect, a method of dynamically tuning of content delivery over a communication network may involve one or more processors of a network node, e.g., a network node, receiving packets of a content delivery traffic that flows through a proxy server, with the content delivery traffic originated from an application server and destined for a user device. The method may also involve the one or more processors of the network node forwarding the packets toward the user device. The method may additionally involve the one or more processors of the network node detecting an event related to the content delivery traffic. The method may further involve the one or more processors of the network node communicating the detected event to the application server.

In some embodiments, the event may include a change in a quality of service (QoS) profile with respect to the user device. In some embodiments, the change in the QoS profile with respect to the user device may include a change in a maximum bit rate, a change in latency, or both.

In some embodiments, the event may include throttling of the content delivery traffic through the communication network.

In some embodiments, in communicating the detected event to the application server, the one or more processors of the network node may transmit a synchronization packet to the application server. In some embodiments, the synchronization packet may include a Transmission Control Protocol synchronization (TCP SYN) packet. In some embodiments, the synchronization packet may include a field indicative of one or more service flow types, a field indicative of one or more access types, a field indicative of quality of service, a field indicative of congestion types, and a field indicative of an experience indicator.

In some embodiments, the method may further involve the one or more processors of the network node receiving additional packets of the content delivery traffic that bypassed the proxy server in response to the communicating.

In some embodiments, the method may further involve the one or more processors of the network node receiving the content delivery traffic at a first rate prior to the detecting, and receiving the content delivery traffic at a second rate different from the first rate in response to the communicating.

In another aspect, a method of dynamically tuning of content delivery over a communication network may involve one or more processors of a user device, e.g., a mobile device such as a smartphone, receiving packets of a content delivery traffic that flows through a proxy server, with the content delivery traffic originated from an application server and destined for the user device. The method may also involve the one or more processors of the user device detecting an event related to the content delivery traffic over the communication network. The method may additionally involve the one or more processors of the user device communicating the detected event to the application server.

In some embodiments, the event may include a change in a QoS profile with respect to the user device. In some embodiments, the change in the QoS profile with respect to the user device may include a change in a maximum bit rate, a change in latency, or both.

In some embodiments, the event may include throttling of the content delivery traffic through the communication network.

In some embodiments, in detecting the event related to the content delivery traffic, the one or more processors of the user device may receive a network triggered event. In some embodiments, in receiving the network triggered event, the one or more processors of the user device may receive the network triggered event via a short message service (SMS).

In some embodiments, in detecting the event related to the content delivery traffic, the one or more processors of the user device may receive a QoS configuration parameter from an operating system (OS) application programming interface (API) of the user device.

In some embodiments, in detecting the event related to the content delivery traffic, the one or more processors of the user device may receive information related to the event from a communication chipset of the user device.

In some embodiments, in communicating the detected event to the application server, the one or more processors of the user device may communicate via in-band signaling. In some embodiments, in communicating via in-band signaling, the one or more processors of the user device may transmit an initial Transmission Control Protocol synchronization (TCP SYN) packet. In some embodiments, in communicating via in-band signaling, the one or more processors of the user device may communicate via in-band signaling by an operating system of the user device.

In some embodiments, in communicating the detected event to the application server, the one or more processors of the user device may communicate via out-of-band signaling. In some embodiments, in communicating the detected event to the application server, the one or more processors of the user device may transmit an initial request HTTP packet. In some embodiments, in communicating via out-of-band signaling, the one or more processors of the user device may communicate via out-of-band signaling by an application executed by the user device.

In some embodiments, the user device may include a portable communication device.

In some embodiments, the method may further involve the one or more processors of the user device receiving the content delivery traffic from the application server at a first rate prior to the detecting, and receiving the content delivery traffic from the application server at a second rate different from the first rate in response to the communicating.

First Example Communication Environment

Figure 1:
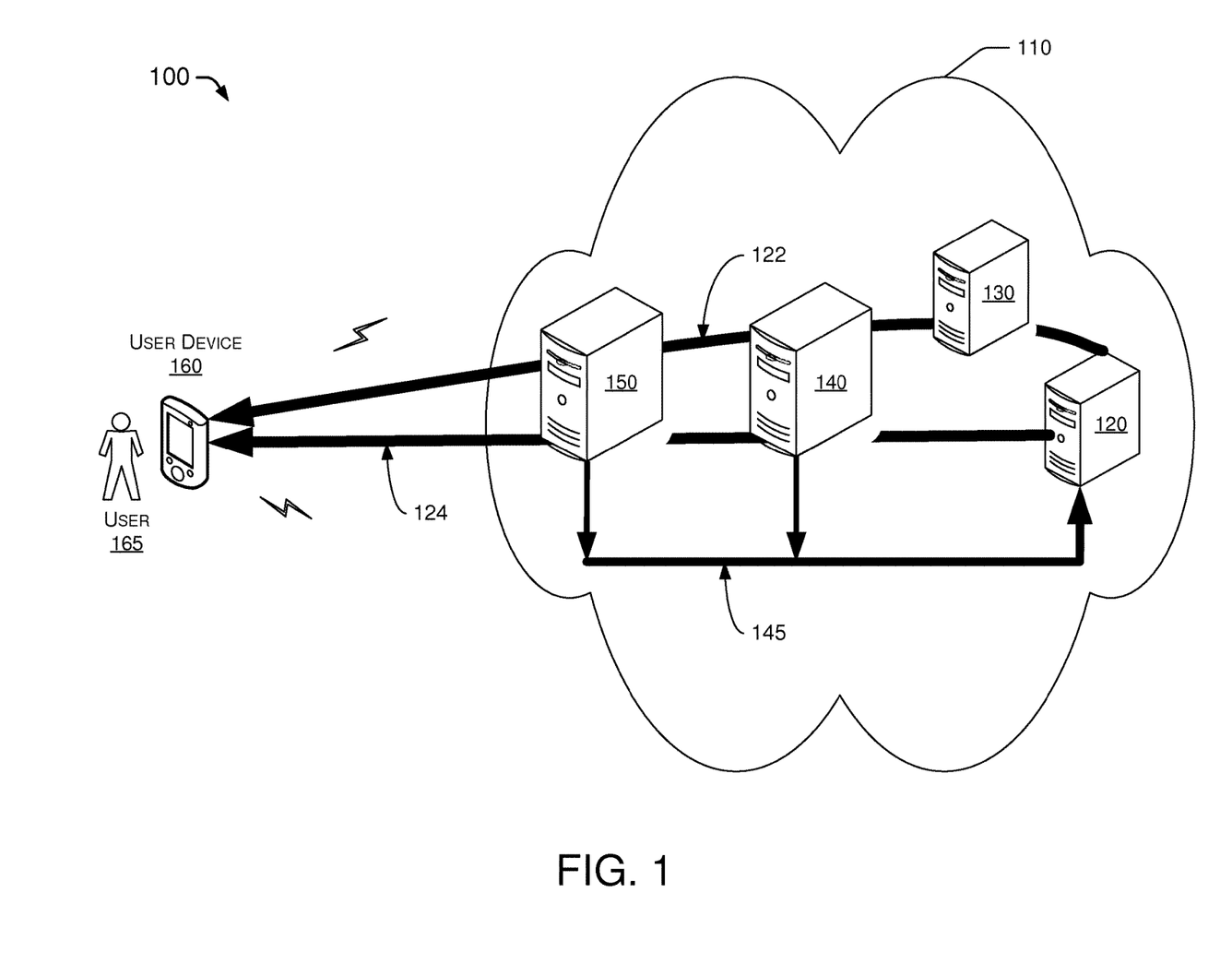
FIG. 1 illustrates an example communication environment in which a network-based embodiment of dynamic tuning of content delivery to a user device is implemented in accordance with the present disclosure.

FIG. 1 illustrates an example communication environment 100 in which a network-based embodiment of dynamic tuning of content delivery to a user device is implemented in accordance with the present disclosure.

Example communication environment 100 includes a content delivery network 110 which is a communication network and may include a wireless network, a wired network or a combination of one or more wireless network and wired network. As shown in FIG. 1, content delivery network 110 includes an application server 120, a proxy server 130, a core network node 140, a radio network node 150 and a user device 160 operated by or otherwise associated with a user 165. Application server 120 is a repository of content, e.g., textual, audio and/or video data, which is requested by and delivered to user device 160. Core network node 140 may be, for example, a gateway general packet radio service support node, or gateway GPRS support node (GGSN). Core network node 140 may alternative be, for example, an access gateway. Radio network node 150 may be, for example, an E-UTRAN node B. User device 160 may be, but not limited to, a mobile device (e.g., smartphones), a telecommunication device, a personal digital assistant (PDA), or a computing device such as, for example, a desktop computer, a laptop computer, a notebook computer, a tablet computer, a wearable computing device, etc.

Those skilled in the art would appreciate that, although a certain number of network nodes and elements are illustrated in FIG. 1, techniques described herein are also applicable to a mobile telecommunications network environments having different numbers of network elements/nodes. Moreover, for simplicity and not to obscure better understanding of techniques of the present disclosure, certain network elements/nodes typically found in 4G/3G/2G networks are not illustrated in FIG. 1. Further, techniques described herein apply to a LTE network, a UMTS network, a GSM network, a wired network and any combination thereof.

In example communication environment 100, one or more of network nodes of content delivery network 110 may be configured to implement embodiments of dynamically tuning of content delivery in accordance with the present disclosure. For example, one or more processors of either or both of core network node 140 and radio network node 150 may be implemented to perform a number of operations. Specifically, the one or more processors of either or both of core network node 140 and radio network node 150 may receive packets of a content delivery traffic via a first flow 122 that flows through proxy server 130, with the first flow 122 of content delivery traffic originated from application server 120 and destined for user device 160. The one or more processors of either or both of core network node 140 and radio network node 150 may forward the packets toward user device 160. The one or more processors of either or both of core network node 140 and radio network node 150 may also detect an event related to the first flow 122 of content delivery traffic. The one or more processors of either or both of core network node 140 and radio network node 150 may communicate the detected event to application server 120. According to the present disclosure, the one or more processors of either or both of core network node 140 and radio network node 150 may communicate to application server 120 every time an event related to the content delivery traffic is detected.

The detected event may be a change in a quality of service (QoS) profile with respect to user device 160. For example, the change in the QoS profile with respect to the user device may include a change in a maximum bit rate, a change in latency, or both. Alternatively, the detected event may be throttling of the first flow 122 of content delivery traffic through content delivery network 110.

In communicating the detected event to application server, the one or more processors of either or both of core network node 140 and radio network node 150 may transmit a synchronization packet 145 to application server 120. The synchronization packet 145 may be a Transmission Control Protocol synchronization (TCP SYN) packet. In some embodiments, the synchronization packet 145 may include a field indicative of one or more service flow types, a field indicative of one or more access types, a field indicative of quality of service, a field indicative of congestion types, and a field indicative of an experience indicator.

Figure 3:
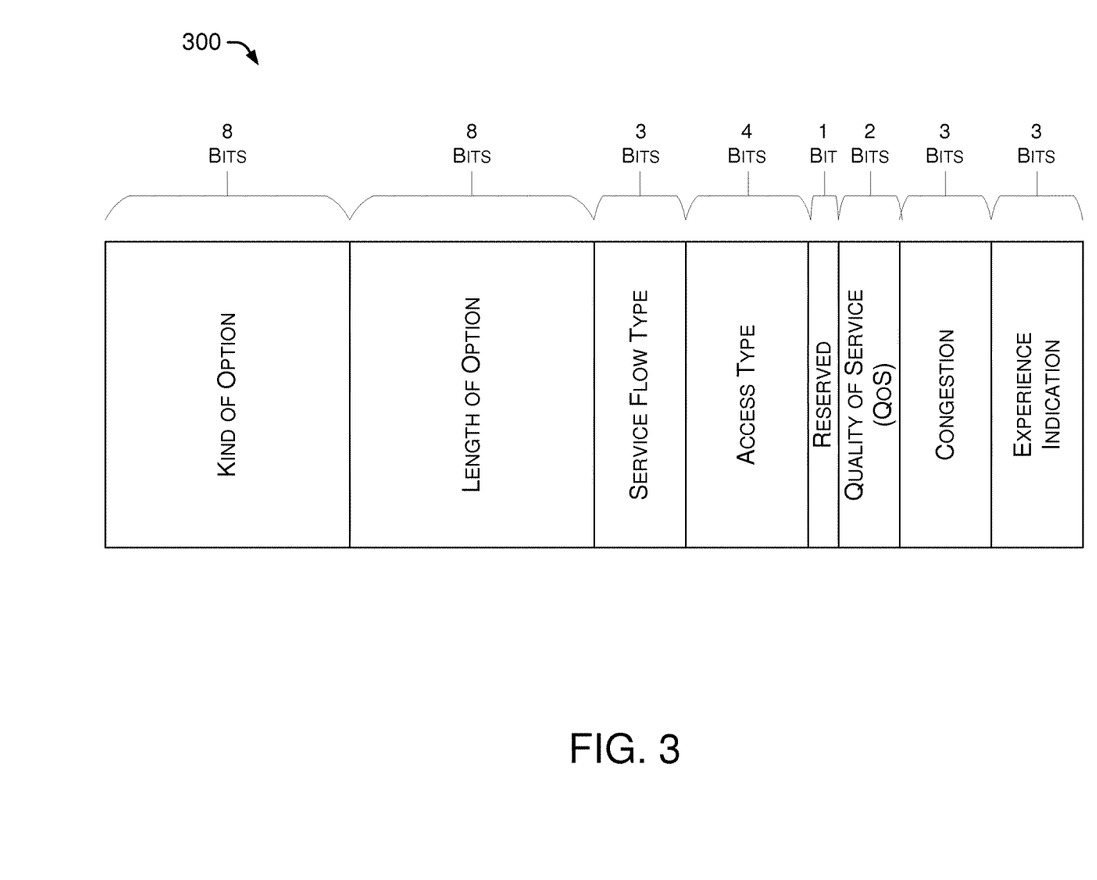
FIG. 3 is a block diagram of an example Transmission Control Protocol synchronization (TCP SYN) packet in accordance with the present disclosure.

During an initial negotiation between application server 120 and either or both of core network node 140 and radio network node 150, options in a TCP packet may be defined for the purpose of communicating congestion state of content delivery network 110. For example, application server 120 may send over values related to certain information to either or both of core network node 140 and radio network node 150 via a TCP SYN packet. The certain information may be related to, for example, maximum bit rate/QoS (which may be a 3-bit value, for example), throttling, service flow type (e.g., audio, video, voice, text) and access type (e.g., VoLTE, 3G, etc.). Over the session, e.g., when the first flow 122 of content delivery traffic is transmitted from application server 120 to user device 160 via either or both of core network node 140 and radio network node 150, the options bytes in the TCP SYN packet may be populated with a number of fields. For illustrative purpose, an example TCP SYN packet is illustrated in FIG. 3 and detailed description thereof will be provided later. Additionally or alternatively, the options may occur within other TCP packets so long as both the client and server send the options in the initial SYN packet. This is necessary for long-lived connections, such as videos and file transfers, so that the client, server or one or more immediary nodes may notify the sending node to adjust the quality or delivery rate. For example, if the client sends the option in the SYN packet but the server does not respond with the option in the SYN ACK, then the connection may proceed without any additional flags or processing. Moreover, if the client sends the option in the SYN packet and the server responds with the options in the SYN ACK, then the connection may proceed with additional flags included as conditions change.

After communicating the detected event to application server 120, the one or more processors of either or both of core network node 140 and radio network node 150 may begin to receive additional packets of the content delivery traffic routed via a second flow 124, which bypasses proxy server 130.

The one or more processors of either or both of core network node 140 and radio network node 150 may receive the content delivery traffic, routed via the first flow 122, at a first rate prior to the detecting, and may receive the content delivery traffic, routed via the second flow 124, at a second rate different from the first rate after the one or more processors of either or both of core network node 140 and radio network node 150 communicated the detected event to application server 120. That is, after receiving notification from the core network node 140 or radio network node 150 about the detected event, which indicates congestion in the content delivery traffic, application server 120 may transmit the content delivery traffic to user device 160 via a new route, e.g., second flow 124, which bypasses proxy server 130. For example, the second rate may be higher than the first rate since proxy server 130 may be bypassed after application server 120 receives the notification about the detected event related to the content delivery traffic.

Second Example Communication Environment

Figure 2:
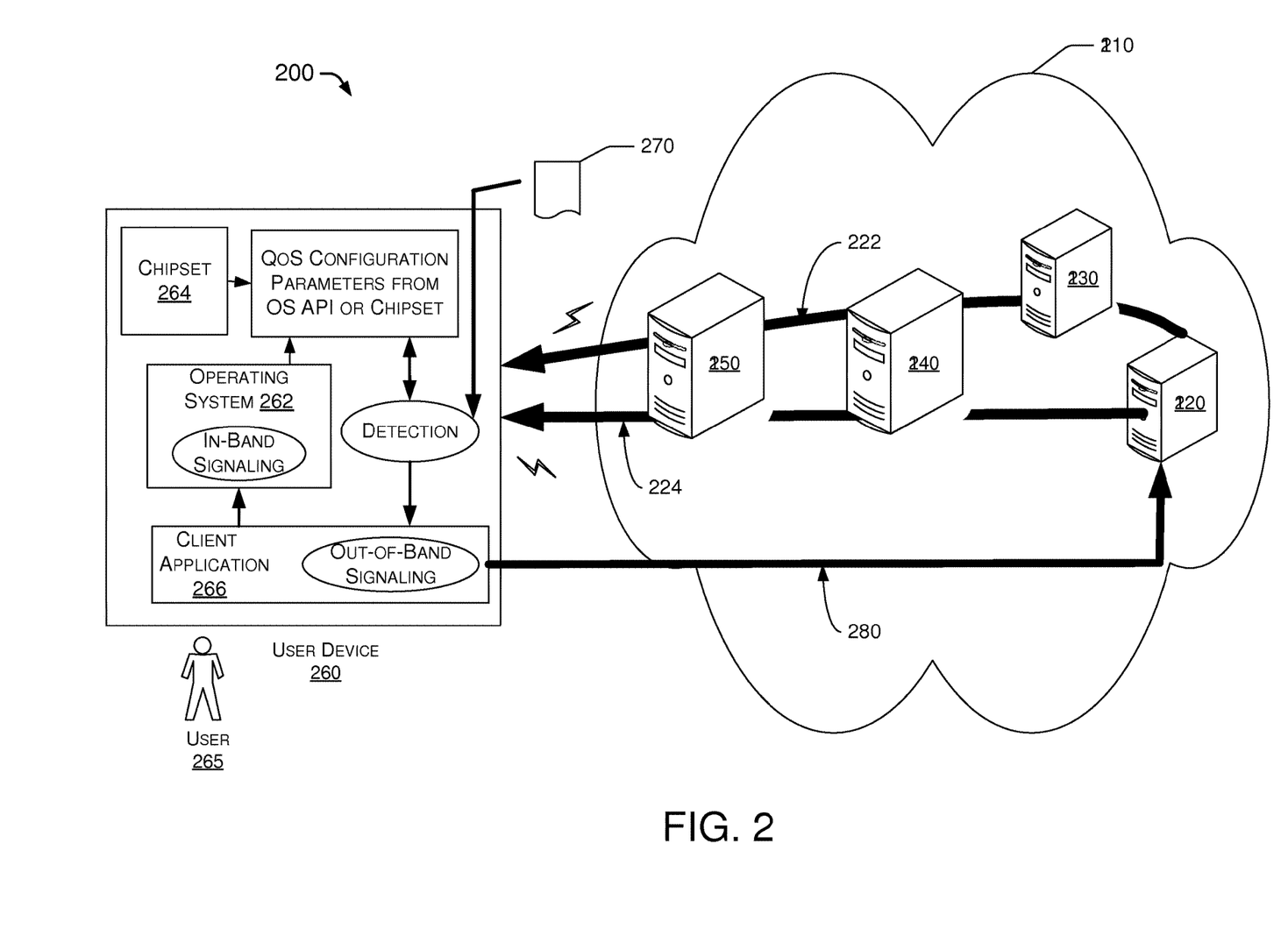
FIG. 2 illustrates an example communication environment in which a device-based embodiment of dynamic tuning of content delivery to a user device is implemented in accordance with the present disclosure.

FIG. 2 illustrates an example communication environment 200 in which a device-based embodiment of dynamic tuning of content delivery to a user device is implemented in accordance with the present disclosure.

Example communication environment 200 includes a content delivery network 210 which is a communication network and may include a wireless network, a wired network or a combination of one or more wireless network and wired network. As shown in FIG. 2, content delivery network 210 includes an application server 220, a proxy server 230, a core network node 240, a radio network node 250 and a user device 260 operated by or otherwise associated with a user 265. Application server 220 is a repository of content, e.g., textual, audio and/or video data, which is requested by and delivered to user device 260. Core network node 240 may be, for example, a GGSN. Core network node 240 may alternative be, for example, an access gateway. Radio network node 250 may be, for example, an E-UTRAN node B. User device 260 may be, but not limited to, a mobile device (e.g., smartphones), a telecommunication device, a personal digital assistant (PDA), or a computing device such as, for example, a desktop computer, a laptop computer, a notebook computer, a tablet computer, a wearable computing device, etc.

Those skilled in the art would appreciate that, although a certain number of network nodes and elements are illustrated in FIG. 2, techniques described herein are also applicable to a mobile telecommunications network environments having different numbers of network elements/nodes. Moreover, for simplicity and not to obscure better understanding of techniques of the present disclosure, certain network elements/nodes typically found in 4G/3G/2G networks are not illustrated in FIG. 2. Further, techniques described herein apply to a LTE network, a UMTS network, a GSM network, a wired network and any combination thereof.

In example communication environment 200, user device 260 may be configured to implement embodiments of dynamically tuning of content delivery in accordance with the present disclosure. For example, one or more processors of user device 260 may be implemented to perform a number of operations. Specifically, the one or more processors of user device 260 may receive packets of a content delivery traffic via a first flow 222 that flows through proxy server 230, with the first flow 222 of content delivery traffic originated from application server 220 and destined for user device 260. The one or more processors of user device 260 may also detect an event related to the first flow 222 of content delivery traffic. The one or more processors of user device 260 may communicate the detected event to application server 220. According to the present disclosure, the one or more processors of user device 260 may communicate to application server 220 every time an event related to the content delivery traffic is detected.

The detected event may be a change in a quality of service (QoS) profile with respect to user device 260. For example, the change in the QoS profile with respect to user device 260 may include a change in a maximum bit rate, a change in latency, or both. Alternatively, the detected event may be throttling of the first flow 222 of content delivery traffic through content delivery network 210.

In detecting the event related to the content delivery traffic, the one or more processors of user device 260 may receive a network triggered event. For example, the one or more processors of user device 260 may receive the network triggered event via a short message service (SMS).

Alternatively, in detecting the event related to the content delivery traffic, the one or more processors of user device 260 may receive a QoS configuration parameter from an API of an operating system 262 of user device 260.

Still alternatively, in detecting the event related to the content delivery traffic, the one or more processors of user device 260 may receive information related to the event from a communication chipset 264 of user device 260.

In one implementation, in communicating the detected event to application server 220, the one or more processors of user device 260 may communicate the detected event to application server 220 via in-band signaling. For example, in communicating the detected event via in-band signaling, the one or more processors of user device 260 may transmit an initial TCP SYN packet. Alternatively, in communicating the detected event via in-band signaling, the one or more processors of user device 260 may communicate via in-band signaling by an operating system of user device 260.

In another implementation, in communicating the detected event to application server 220, the one or more processors of user device 260 may communicate via out-of-band signaling. For example, in communicating the detected event to application server 220, the one or more processors of user device 260 may transmit an initial request HTTP packet. Alternatively, in communicating the detected event via out-of-band signaling, the one or more processors of user device 260 may communicate via out-of-band signaling by a client application 266 executed by user device 260.

The one or more processors of user device 260 may receive the content delivery traffic, routed via the first flow 222, from application server 220 at a first rate prior to detecting the event related to the content delivery traffic. The one or more processors of user device 260 may receive the content delivery traffic, routed via a second flow 224, from application server 220 at a second rate different from the first rate after the one or more processors of user device 260 communicated the detected event to application server 220. That is, after receiving notification from the user device 260 about the detected event, which indicates congestion in the content delivery traffic, application server 220 may transmit the content delivery traffic to user device 160 via a new route, e.g., second flow 124, which bypasses proxy server 230. For example, the second rate may be higher than the first rate since proxy server 230 may be bypassed after application server 220 receives the notification about the detected event related to the content delivery traffic.

Example Implementations

FIG. 3 is a block diagram of an example Transmission Control Protocol synchronization (TCP SYN) packet 300 in accordance with the present disclosure. In TCP, there is an options area in a packet that may be used to specify the kind of option (8 bits), the length of option (8 bits), and user-defined parameters. As shown in FIG. 3, example TCP SYN packet 300 includes four bytes, or 32 bits, with the first byte used to indicate the kind of option and the second byte used to indicated the length of option. In some embodiments, if more than 32 bits are necessary, then a redirection to payload may be utilized.

As shown in FIG. 3, the third byte may be used to indicate service flow type and access type. For example, three bits of the third byte may be used to indicate the service flow type, four bits of the third byte may be used to indicate the access type, and the remaining bit of the third byte may be reserved for future use.

The service flow type field may indicate the type of service flow, which may include audio, video, voice and/or textual data. For example, values in the three bits used to indicate the service flow type may indicate voice, VoIP, video, or text data. The access type field may indicate the type of access, which may include voice over long-term evolution (VoLTE), 3G, etc. For example, values in the four bits used to indicate the access type may indicate 2G, 3G, LTE, LTE D, 5G, WiFi, Bluetooth, DSL, cable, satellite or WiMax. The reserved one bit of the third byte may be used as a debug flag. For example, if debug flag is set (e.g., value=1), then redirection to a well-known location in the payload, which may be populated from a chipset, may be executed.

As shown in FIG. 3, the fourth byte may be used to indicate level of QoS, congestion state and experience indicator. For example, two bits of the fourth byte may be used to indicate the level of QoS, three bits of the fourth byte may be used to indicate the congestion state, and three bits of the fourth byte may be used to indicate the experience indicator.

The level of QoS field may indicate the level of QoS of a given traffic of packets. For example, values in the two bits used to indicate the level of QoS may indicate full speed, medium speed, low speed or a reserved state. The congestion state field may indicate the state of congestion. For example, values in the three bits used to indicate the congestion state may indicate download light, download heavy, download overload, uplink, metered, zero-rated, throttled or usage high. The experience indicator field may indicate the experience from the perspective of a recipient (e.g., user device 160 or user device 260) with respect to a flow of content delivery traffic. For example, the left-most bit (or most significant bit) of the three bits may be used to indicate whether the experience is good or bad (e.g., 1=good and 0=bad). Further, the remaining two bits of the three bits may be used to indicate a counter of a number of consecutive packets meeting the condition indicated by the left-most bit (or most significant bit). For instance, a value 111 in the experience indicator field may indicate that there are three good packets in a row, and a value 001 may indicate that there is one bad packet in a row.

In example communication environments 100 and 200, the application server (e.g., application server 120/220), network nodes (e.g., core network node 140/240 and radio network node 150/250) and client device (e.g., user device 160/260) may participate in the protocol that utilizes example TCP SYN packet 300. In the event that a corrupt packet arrives, a network node may dynamically ignore the options populated in the packet and send over a notification (e.g., with a value −1 to indicate failure).

Example TCP SYN packet 300 is one example that may be utilized to encode bits in a protocol. Other suitable approaches may be taken in the alternative or as an addition. For example, encoding may be done by one or more of the following approaches in communicating about a detected event related to content delivery traffic: setting one bit (e.g., flag), setting value over multiple bits (e.g., 0=none, but value=degree), setting multiple flags (e.g., bit field), using magic numbers or predefined numbers, multiplexing (e.g., odd-indexed packets versus even-indexed packets), redirecting to elsewhere in payload, and sending an all specify bit mask.

Figure 4:
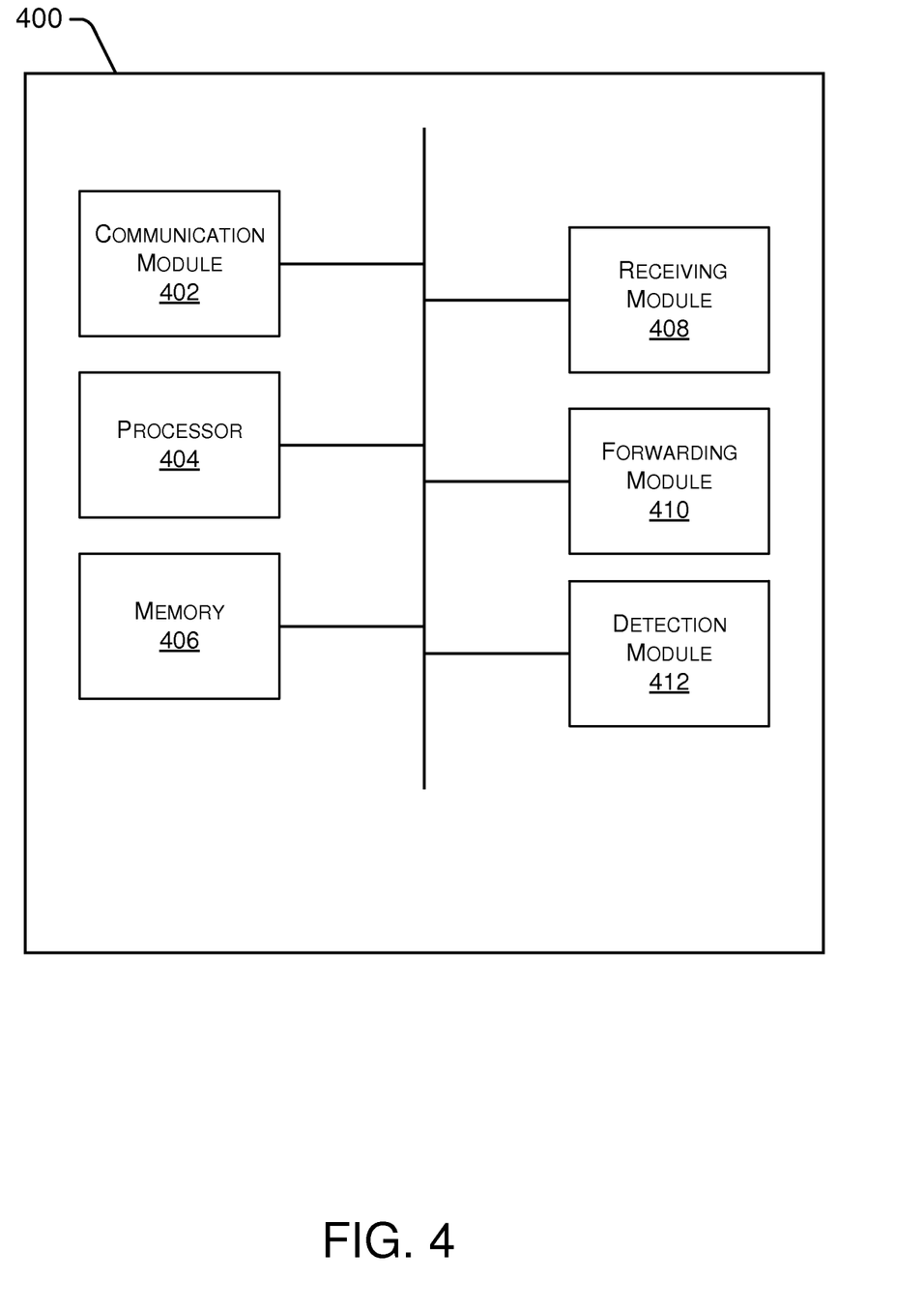
FIG. 4 is a block diagram of an example communication device configured to implement dynamic tuning of content delivery in accordance with the present disclosure.

FIG. 4 is a block diagram of an example communication device 400 configured to implement dynamic tuning of content delivery in accordance with the present disclosure. Example communication device 400 may be implemented as, for example, for example, core network node 140, radio network node 150, core network node 240 and/or radio network node 250. In some embodiments, example communication device 400 may be implemented as one or more computing devices that cooperatively implement the functions described herein. Example communication device 400 may include a communication module 402, one or more processors (shown as a processor 404 in FIG. 4), and a memory 406. Communication module 402 allows example communication device 400 to communicate with other systems, such as communication networks, other servers, etc. Processor 404 executes one or more sets of instructions to implement the functionality provided by example communication device 400. Memory 406 stores the one or more sets of instructions executable by processor 404 as well as other data used by processor 404. Example communication device 400 may also include a receiving module 408, a forwarding module 410 and a detection module 412. Although the receiving module 408, forwarding module 410 and detection module 412 are depicted as discrete modules separate from the processor 404, in various implementations one or more of receiving module 408, forwarding module 410 and detection module 412 may be part of the processor 404 or communication module 402.

Receiving module 408 may be configured to receive packets of a content delivery traffic that flows through a proxy server, with the content delivery traffic originated from an application server and destined for a user device.

Forwarding module 410 may be configured to forward the packets toward the user device.

Detection module 412 may be configured to detect an event related to the content delivery traffic. For example, detection module 412 may detect a change in a QoS profile with respect to the user device. In some embodiments, the change in the QoS profile with respect to the user device may include a change in a maximum bit rate, a change in latency, or both. Alternatively, detection module 412 may detect throttling of the content delivery traffic through the communication network.

Communication module 402 may be further configured to communicate the detected event to the application server. For example, communication module 402 may transmit a synchronization packet to the application server. In some embodiments, the synchronization packet may include a TCP SYN packet. In some embodiments, the synchronization packet may include a field indicative of one or more service flow types, a field indicative of one or more access types, a field indicative of quality of service, a field indicative of congestion types, and a field indicative of an experience indicator.

In some embodiments, receiving module 408 may receive additional packets of the content delivery traffic that bypassed the proxy server in response to the communication module 402 communicating the detected event to the application server.

In some embodiments, receiving module 408 may receive the content delivery traffic at a first rate prior to the detecting, and receiving the content delivery traffic at a second rate different from (e.g., higher or lower than) the first rate in response to the communicating.

Example Processes

Figure 5:
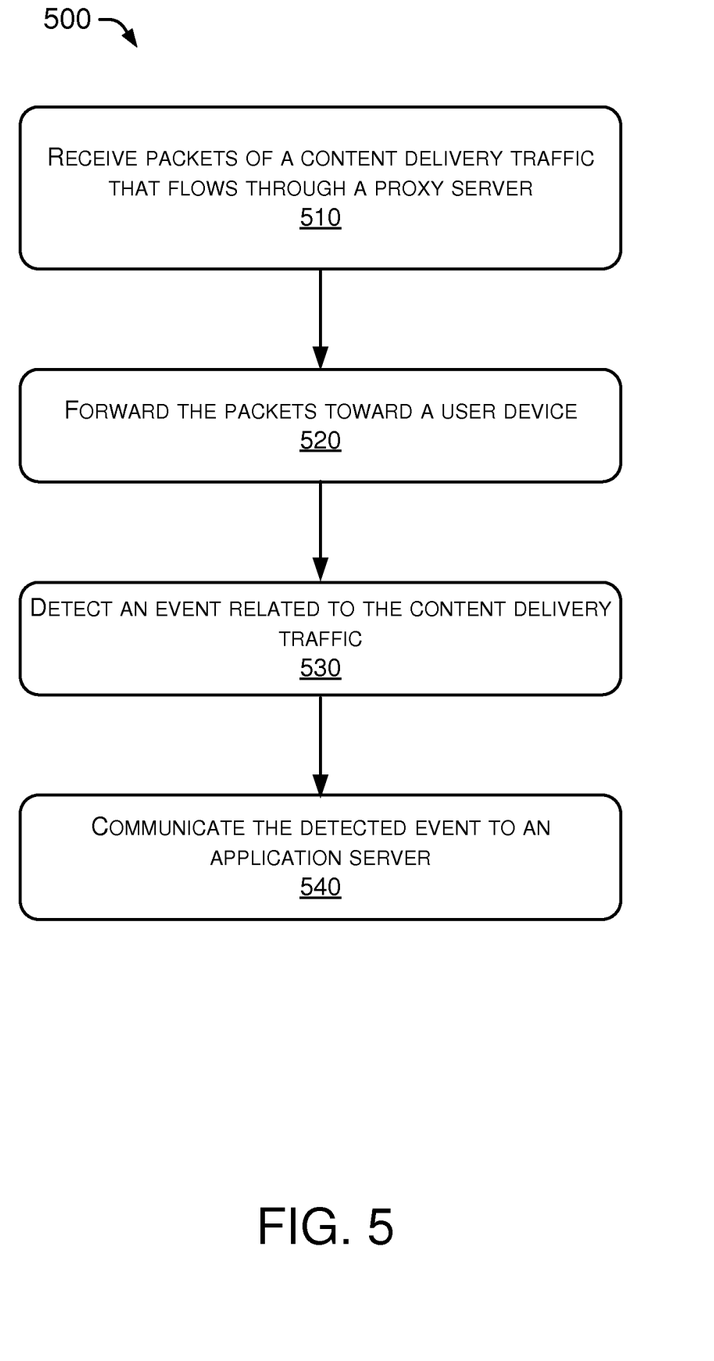
FIG. 5 is a flow diagram of an example process for dynamically tuning of content delivery over a communications network in accordance to the present disclosure.

FIG. 5 is a flow diagram of an example process 500 for dynamically tuning of content delivery over a communications network in accordance to the present disclosure. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors equipped in, for example, core network node 140, radio network node 150, core network node 240 and/or radio network node 250. For illustrative purposes, the operations described below are performed by one or more processors of a network node, which may be core network node 140, radio network node 150, core network node 240 or radio network node 250.

At 510, one or more processors of a network node may receive packets of a content delivery traffic that flows through a proxy server, with the content delivery traffic originated from an application server and destined for a user device.

At 520, the one or more processors of the network node may forward the packets toward the user device.

At 530, the one or more processors of the network node may detect an event related to the content delivery traffic.

At 540, the one or more processors of the network node may communicate the detected event to the application server.

In some embodiments, the event may include a change in a QoS profile with respect to the user device. In some embodiments, the change in the QoS profile with respect to the user device may include a change in a maximum bit rate, a change in latency, or both.

In some embodiments, the event may include throttling of the content delivery traffic through the communication network.

In some embodiments, in communicating the detected event to the application server, process 500 may involve the one or more processors of the network node transmitting a synchronization packet to the application server. In some embodiments, the synchronization packet may include a TCP SYN packet. In some embodiments, the synchronization packet may include a field indicative of one or more service flow types, a field indicative of one or more access types, a field indicative of quality of service, a field indicative of congestion types, and a field indicative of an experience indicator.

In some embodiments, in communicating the detected event to the application server, process 500 may involve the one or more processors of the network node communicating one or more windows of time of permitted or restricted activities.

In some embodiments, process 500 may further involve the one or more processors of the network node receiving additional packets of the content delivery traffic that bypassed the proxy server in response to the communicating.

In some embodiments, process 500 may further involve the one or more processors of the network node receiving the content delivery traffic at a first rate prior to the detecting, and receiving the content delivery traffic at a second rate different from the first rate in response to the communicating. For example, the second rate may be higher than the first rate since the proxy server may be bypassed after the application server receives the notification about the detected event related to the content delivery traffic.

In some embodiments, in communicating the detected event to the application server, process 600 may involve the one or more processors of the network node communicating the detected event via in-band signaling. In some embodiments, in communicating the detected event via in-band signaling, process 500 may involve the one or more processors of the user device transmitting an initial TCP SYN packet.

In some embodiments, process 500 may further involve the one or more processors of the network node tuning the content delivery traffic.

In some embodiments, the tuning may include one or more of the following: reducing initial quality of video traffic, reducing quality of video or data traffic being transferred, delaying transfer of notifications, improving initial quality of video or data traffic, and restricting video traffic during congestion.

Figure 6:
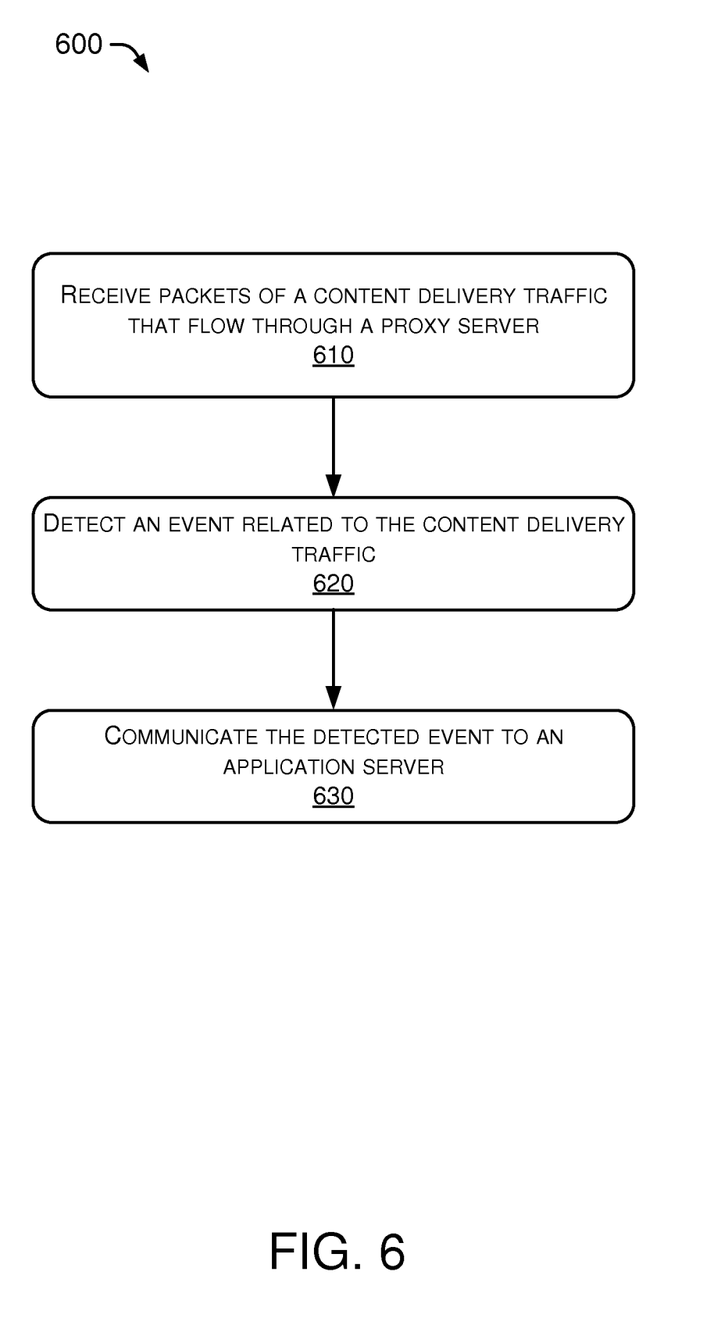
FIG. 6 is a flow diagram of another example process for dynamically tuning of content delivery over a communications network in accordance to the present disclosure.

FIG. 6 is a flow diagram of another example process 600 for dynamically tuning of content delivery over a communications network in accordance to the present disclosure. Example process 600 includes one or more operations, actions, or functions. Although illustrated as discrete blocks, various blocks may be divided into additional blocks, combined into fewer blocks, or eliminated, depending on the desired implementation. Process 600 may be implemented by one or more processors equipped in, for example, user device 160 and/or user device 260. For illustrative purposes, the operations described below are performed by one or more processors of a user device, which may be user device 160 or user device 260.

At 610, one or more processors of a user device may receive packets of a content delivery traffic that flows through a proxy server, with the content delivery traffic originated from an application server and destined for the user device.

At 620, the one or more processors of the user device may detect an event related to the content delivery traffic over the communication network.

At 630, the one or more processors of the user device may communicate the detected event to the application server.

In some embodiments, the event may include a change in a QoS profile with respect to the user device. In some embodiments, the change in the QoS profile with respect to the user device may include a change in a maximum bit rate, a change in latency, or both.

In some embodiments, the event may include throttling of the content delivery traffic through the communication network.

In some embodiments, in detecting the event related to the content delivery traffic, process 600 may involve the one or more processors of the user device receiving a network triggered event. In some embodiments, in receiving the network triggered event, the one or more processors of the user device may receive the network triggered event via a short message service (SMS).

In some embodiments, in detecting the event related to the content delivery traffic, process 600 may involve the one or more processors of the user device receiving a QoS configuration parameter from an operating system (OS) application programming interface (API) of the user device.

In some embodiments, in detecting the event related to the content delivery traffic, process 600 may involve the one or more processors of the user device receiving information related to the event from a communication chipset of the user device.

In some embodiments, in communicating the detected event to the application server, process 600 may involve the one or more processors of the user device communicating the detected event via in-band signaling. In some embodiments, in communicating the detected event via in-band signaling, process 600 may involve the one or more processors of the user device transmitting an initial TCP SYN packet. In some embodiments, in communicating the detected event via in-band signaling, process 600 may involve the one or more processors of the user device communicating via in-band signaling by an operating system of the user device.

In some embodiments, in communicating the detected event to the application server, process 600 may involve the one or more processors of the user device communicating the detected event via out-of-band signaling. In some embodiments, in communicating the detected event to the application server, process 600 may involve the one or more processors of the user device transmitting an initial request HTTP packet. In some embodiments, in communicating the detected event via out-of-band signaling, process 600 may involve the one or more processors of the user device communicating via out-of-band signaling by an application executed by the user device.

In some embodiments, the user device may include a portable communication device, e.g., a smartphones, a telecommunication device, a PDA, or a computing device such as, for example, a desktop computer, a laptop computer, a notebook computer, a tablet computer, computing device, etc.

In some embodiments, in communicating the detected event to the application server, process 600 may involve the one or more processors of the user device communicating one or more windows of time of permitted or restricted activities.

In some embodiments, process 600 may further involve the one or more processors of the user device receiving the content delivery traffic from the application server at a first rate prior to the detecting, and receiving the content delivery traffic from the application server at a second rate different from the first rate in response to the communicating. For example, the second rate may be higher than the first rate since the proxy server may be bypassed after the application server receives the notification about the detected event related to the content delivery traffic.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of dynamically tuning of content delivery over a wireless communication network, comprising:
   receiving, at a network node of the wireless communication network, packets of a content delivery traffic that flows through a proxy server, the content delivery traffic originated from an application server and destined for a user device;
   forwarding, by the network node of the wireless communication network, the packets toward the user device;
   detecting, by the network node of the wireless communication network, a congestion state related to the content delivery traffic that indicates data downloading to the user device is throttled;
   communicating, by the network node of the wireless communication network, the congestion state to the application server to indicate to the application server that data downloading to the user device is throttled by the wireless communication network; and in response to communication of the congestion state indicating that data downloading to the user device is throttled by the wireless communication network to the application server, receiving additional packets of the content delivery traffic from the application server at the network node that bypassed the proxy server, wherein bypassing the proxy server provides a new traffic flow rate for the content delivery traffic that is higher than an original traffic flow rate associated with the content delivery traffic flowing through the proxy server.

2. The method of claim 1, further comprising, communicating, by the network node of the wireless communication network, an event related to the content delivery traffic that comprises a change in a quality of service (QoS) profile with respect to the user device.

3. The method of claim 2, wherein the change in the QoS profile with respect to the user device comprises a change in a maximum bit rate, a change in latency, or both.

4. The method of claim 1, wherein the communicating the congestion state includes communicating the congestion state via a Transmission Control Protocol synchronization (TCP SYN) packet.

5. The method of claim 4, wherein the TCP SYN packet further comprises a field indicative of one or more service flow types, a field indicative of one or more access types, a field indicative of quality of service, and a field indicative of an experience indicator.

6. The method of claim 1, further comprising communicating, by the network node of the wireless communication network, one or more windows of time during which a specific content delivery activity via the content delivery traffic that flows through the proxy server is prohibited.

7. The method of claim 1, wherein the communicating comprises communicating via in-band signaling.

8. The method of claim 7, wherein the communicating via in-band signaling comprises transmitting an initial Transmission Control Protocol synchronization (TCP SYN) packet.

9. The method of claim 1, further comprising tuning the content delivery.

10. The method of claim 9, wherein the tuning comprises one or more of reducing initial quality of video traffic, reducing quality of video or data traffic being transferred, delaying transfer of notifications, improving initial quality of video or data traffic, or restricting video traffic during congestion.

11. A user device, comprising:
one or more processors; and
memory having instructions stored therein, the instructions, when executed by the one or more processors, cause the one or more processors to perform acts comprising:
receiving packets of a content delivery traffic that flows through a proxy server, the content delivery traffic originated from an application server and destined for the user device;
detecting an event related to the content delivery traffic that indicates a congestion in the content delivery traffic;
communicating the detected event to the application server via a synchronization packet, the synchronization packet comprising an indicator field that indicates a user device experience due to the congestion in the content delivery traffic, the indicator field including a bit that indicates a condition of the user device experience, and one or more bits that indicate a number of consecutive packets in the content delivery traffic that meets the condition; and
receiving, in response to communication of the event that indicates the congestion in the content delivery traffic to the application server, additional packets of the content delivery traffic from the application server at the user device that bypassed the proxy server,
wherein bypassing the proxy server provides a new traffic flow rate for the content delivery traffic that is higher than an original traffic flow rate associated with the content delivery traffic flowing through the proxy server.

12. The user device of claim 11, wherein the event comprises a change in a quality of service (QoS) profile with respect to the user device.

13. The user device of claim 12, wherein the change in the QoS profile with respect to the user device comprises a change in a maximum bit rate, a change in latency, or both.

14. The user device of claim 11, wherein the event comprises throttling of the content delivery traffic through a communication network.

15. The user device of claim 11, wherein the detecting comprises receiving a network triggered event.

16. The user device of claim 15, wherein the receiving the network triggered event comprises receiving the network triggered event via a short message service (SMS).

17. The user device of claim 11, wherein the detecting comprises receiving a quality of service (QoS) configuration parameter from an operating system (OS) application programming interface (API) of the user device.

18. The user device of claim 11, wherein the detecting comprises receiving information related to the event from a communication chipset of the user device.

19. The user device of claim 11, wherein the communicating comprises communicating via in-band signaling.

20. The user device of claim 19, wherein the communicating via in-band signaling comprises communicating via in-band signaling by an operating system of the user device.

21. The user device of claim 11, wherein the communicating comprises communicating via out-of-band signaling.

22. The user device of claim 21, wherein the communicating via out-of-band signaling comprises transmitting an initial request HTTP packet.

23. The user device of claim 21, wherein the communicating via out-of-band signaling comprises communicating via out-of-band signaling by an application executed by the user device.

24. The user device of claim 11, wherein the communicating further comprises communicating one or more windows of time of permitted or restricted activities.

25. The user device of claim 11, further comprising:
receiving the content delivery traffic at a first rate prior to the detecting; and
receiving the content delivery traffic at a second rate different from the first rate in response to the communicating.

26. The method of claim 6, wherein the receiving includes receiving the additional packets of the content delivery traffic from the application server at the network node that bypassed the proxy server in response to communication of the congestion state and the one or more windows of time during which the specific content delivery activity via the content delivery traffic that flows through the proxy server is prohibited.

* * * * *